P. H. MAYO & T. ATKINSON.
Removable Cover or Fronts for Pails.
No. 215,828. Patented May 27, 1879.
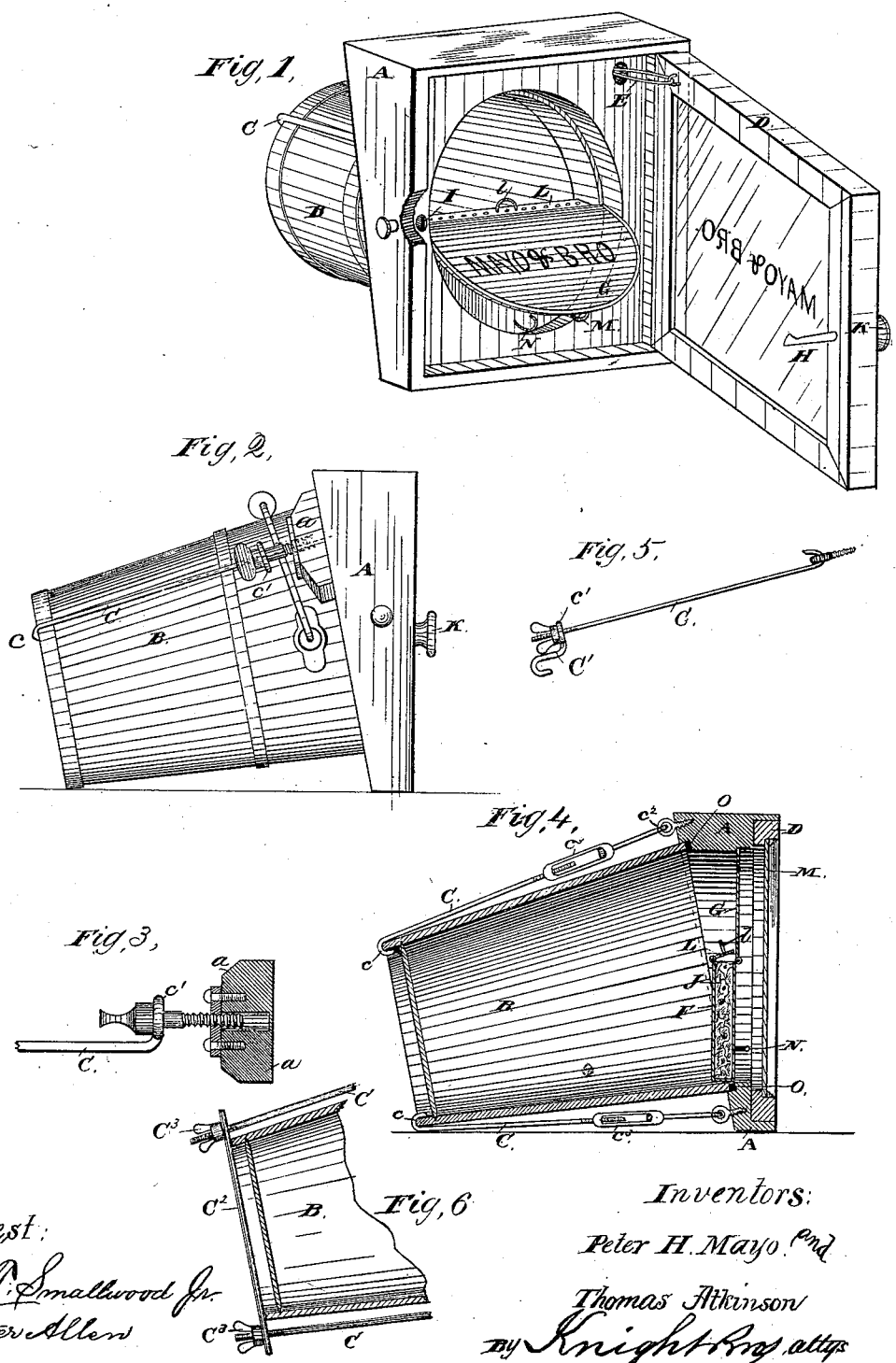
Attest:
Geo. P. Smallwood Jr.
Walter Allen
Inventors:
Peter H. Mayo and
Thomas Atkinson
By Knight Bros, attys

UNITED STATES PATENT OFFICE.

PETER H. MAYO AND THOMAS ATKINSON, OF RICHMOND, VIRGINIA.

IMPROVEMENT IN REMOVABLE COVERS OR FRONTS FOR PAILS.

Specification forming part of Letters Patent No. 215,828, dated May 27, 1879; application filed March 14, 1879.

*To all whom it may concern:*

Be it known that we, PETER H. MAYO and THOMAS ATKINSON, both of Richmond, in the county of Henrico and State of Virginia, have invented a new and useful Removable Cover or Front for Pails, Kegs, and other Round Packages, of which the following is a specification.

The subject of our invention is a removable cover or front adapted for ready application to pails of fine-cut tobacco, or kegs or barrels of dried fruit, preserves, or other articles which it may be desirable to expose to view, and at the same time protect from the atmosphere and from dust, said cover being so formed as to present a perpendicular front while the pail or other tapering package is placed on its side. This front is provided with suitable appliances for fastening it tightly over the margin of the pail, and with a glazed door through which the contents may be viewed, and which gives access to the interior of the pail.

Our improvements consist in combining, with a frame having a glazed door, an inner partition occupying the lower part of the pail-mouth, and adapted to confine the material within the pail when the latter is in horizontal position.

Our improvements further consist in combining, with the aforesaid front and inner partition, a shutter adapted to extend the partition over the whole top or mouth of the pail, so as to conceal the contents or confine moisture, or for other purposes.

In order that our invention may be fully understood, we will proceed to describe it with reference to the accompanying drawings, in which—

Figure 1 is a perspective view of our improved front applied to a pail. Fig. 2 is a side view of the same. Fig. 3 is a sectional view of the screw attachment on a larger scale. Fig. 4 is a vertical longitudinal section, illustrating a modification. Fig. 5 is a view of one of the fastening-rods and its attachments, illustrating another modification. Fig. 6 is a view of a modification in the mode of fastening the bottom or rear ends of the rods.

A represents a frame having a square front with a hinged door, D, and formed at back with a rabbet, $a$, to fit the margin of a pail, B. This frame is constructed in the tapering or beveled shape represented to cause its front to stand in perpendicular position, while the pail to which it is applied is laid flat, resting on the shelf or counter, as shown in Figs. 2 and 4. This cover is tightly drawn over the top of the pail by two or more rods, C, formed with hooks $c$ to take over the bottom chine of the pail, and tightened by screws, which may have the form of thumb-screws, as shown in Figs. 2 and 3, passing through transverse eyes $c^1$ on the forward ends of the rods, and engaging in screw-sockets $a$ secured to the frame A.

If preferred the rods may have a hook, $c$ $c^2$, at each end, as shown in Fig. 4, and in their intermediate part a screw-link, $c^3$, of familiar construction, by which the rods may be tightened up to any necessary extent; or the rods C, being attached to the frame A by the simple hook-and-eye fastening, shown in Fig. 4, or any other convenient mode, may be screw-threaded at their rear ends, and passed through the transversely-bent eyes $c^1$ of supplemental hooked rods $C^1$, as in Fig. 5, or through the ends of a bar, $C^2$, placed across the bottom of the pail, and secured by thumb-nuts $C^3$, as in Fig. 6.

The door D is provided with a glass pane, and is drawn shut by a rubber or other spring, E, which should extend, as shown, within the frame A, so as to have sufficient play to completely close the door and permit it to open easily.

By the use of spring-hinges of any approved construction, the spring E may be dispensed with. The door is further provided with a hasp, H, and with a spring-catch, I, to secure it; also, with a knob, K, for opening it.

Within the frame is a hollow partition, F, occupying one-half the height of the opening, and preventing the contents from falling forward against the glass door. This hollow partition contains a water-chamber, in which is a sponge, J, to contain water, the evaporation of which serves to prevent undue drying of the material within the pail.

To the upper edge of the partition F is hinged a shutter, G, for completely closing the interior of the pail, which is advantageous at times for various purposes, either to more perfectly confine the moisture or to conceal the contents.

The top of the water-chamber is closed by a cover, L, which is perforated, as shown in Fig. 1, to allow the escape of vapor into the pail. The said cover has a loop or handle, $l$, for opening it. M is a handle on the shutter G for operating it, and N is a similar handle for withdrawing the partition.

Luting may be applied, as shown at O, between the pail and frame to make a tight joint. If desired, luting may also be applied between the shutter G and the frame.

Our mode of providing a pail or like package with a cover so formed and applied as to present a perpendicular front when the pail is laid on its side is of great practical value in that it causes such tapering and round packages to occupy a straight and square line with square packages on the shelves, so that the retailer can continue his line of samples or show-boxes, whether square or round, on the same line and with a uniform front.

Having thus described our invention, the following is what we claim as new therein and desire to secure by Letters Patent:

1. The pail-cover herein described, constructed with a door, D, a rabbet, $a$, for the reception of the margin of the pail, a beveled frame to present a perpendicular front while the margin of the pail is inclined, and suitable appliances for clamping the cover firmly over the margin of the pail, substantially as herein described.

2. The combination, with the cover A D, of the removable inner partition, F, constructed and applied as herein described.

3. The combination, with the glass door D, of the removable hollow inner partition, F, and the hinged shutter G, constituting an extension of said partition, as and for the purposes set forth.

P. H. MAYO.
THOMAS ATKINSON.

Witnesses:
GEO. B. HARRISON,
GEORGE H. BURWELL.